United States Patent
Ostafin et al.

(10) Patent No.: US 9,938,396 B2
(45) Date of Patent: Apr. 10, 2018

(54) NANOCOMPOSITE MATERIALS WITH DYNAMICALLY ADJUSTING REFRACTIVE INDEX AND METHODS OF MAKING THE SAME

(71) Applicant: University of Utah Research Foundation, Salt Lake City, UT (US)

(72) Inventors: Agnes Ostafin, Salt Lake City, UT (US); Hiroshi Mizukami, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 134 days.

(21) Appl. No.: 14/877,520

(22) Filed: Oct. 7, 2015

(65) Prior Publication Data
US 2016/0024281 A1 Jan. 28, 2016

Related U.S. Application Data

(62) Division of application No. 12/347,870, filed on Dec. 31, 2008, now abandoned.
(Continued)

(51) Int. Cl.
*C08K 9/02* (2006.01)
*G02B 6/02* (2006.01)
(Continued)

(52) U.S. Cl.
CPC ............. *C08K 9/02* (2013.01); *B82Y 20/00* (2013.01); *B82Y 30/00* (2013.01); *C04B 35/628* (2013.01);
(Continued)

(58) Field of Classification Search
None
See application file for complete search history.

(56) References Cited

U.S. PATENT DOCUMENTS

| 4,503,169 A | 3/1985 | Randklev |
| 5,763,085 A | 6/1998 | Atarashi et al. |

(Continued)

OTHER PUBLICATIONS

Eldada (Proc. SPIE vol. 4642, p. 11-22, Organic Photonic Materials and Devices IV, Bernard Kippelen; Donal D. Bradley; Eds; Published Jun. 2002).

(Continued)

*Primary Examiner* — Alexandre F Ferre
(74) *Attorney, Agent, or Firm* — Thorpe North & Western, LLP

(57) ABSTRACT

A concept and synthesis technology for a composite nanoparticle material which can be used to develop nanocomposite films and suspension with 1) dynamic refractive index control across a wide temperature and wavelength of light, and specified refractive index range, or 2) magnetic susceptibility or electronic conductivity over a wide temperature, magnetic field and electric field range. Core-shell nanoparticles can be made from two or more materials whose temperature dependent, electric field dependent or magnetic field dependent properties compensate one another will dynamically maintain a targeted refractive index, electronic conductivity or magnetic susceptibility over a specified temperature, electric and/or magnetic field range. Mixtures of composite nanoparticles with complementary behavior can optionally be used to widen the operational range of the nanocomposite material further or dampen temperature dependency in a controlled manner, e.g. using a non-random distribution of particles to affect a compensating gradient in the property of interest.

28 Claims, 4 Drawing Sheets

Related U.S. Application Data

(60) Provisional application No. 61/018,168, filed on Dec. 31, 2007.

(51) Int. Cl.
    *B82Y 20/00*    (2011.01)
    *B82Y 30/00*    (2011.01)
    *C04B 35/628*    (2006.01)

(52) U.S. Cl.
    CPC .. *C04B 35/62807* (2013.01); *C04B 35/62823* (2013.01); *C04B 35/62886* (2013.01); *C04B 35/62894* (2013.01); *C04B 35/62897* (2013.01); *G02B 6/0229* (2013.01); *C04B 2235/3244* (2013.01); *Y10T 428/25* (2015.01); *Y10T 428/2991* (2015.01)

(56) References Cited

U.S. PATENT DOCUMENTS

| | | |
|---|---|---|
| 6,132,873 A | 10/2000 | Dietz et al. |
| 6,479,146 B1 | 11/2002 | Caruso et al. |
| 6,905,766 B2 | 6/2005 | Chandler |
| 6,913,825 B2 | 7/2005 | Ostafin et al. |
| 7,045,569 B2 | 5/2006 | James et al. |
| 7,081,295 B2 | 7/2006 | James et al. |
| 7,144,627 B2 | 12/2006 | Halas et al. |
| 7,147,916 B2 | 12/2006 | Iwasaki et al. |
| 7,238,751 B2 | 7/2007 | Wang et al. |
| 7,405,002 B2 | 7/2008 | Ying et al. |
| 2002/0068187 A1 | 6/2002 | O'Connor et al. |
| 2003/0157330 A1 | 8/2003 | Ostafin et al. |

OTHER PUBLICATIONS

Huijuan Dun et al., Layer-by-Layer Self-Assembly of Multilayer Zirconia Nanoparticles on Silica Spheres for HPLC Packings. Analytical Chemistry, vol. 76, No. 17, Sep. 1, 2004. pp. 5016-5023.

Martin Jerman et al., Refractive index of thin films of Si02, Zr02, and Hf02 as a function of the films' mass density. Applied OpticsNol. 44, No. 15/20 May 2005. pp. 3006-3012.

NANOCOMPOSITE MATERIALS WITH DYNAMICALLY ADJUSTING REFRACTIVE INDEX AND METHODS OF MAKING THE SAME

RELATED APPLICATIONS

This application is a divisional of U.S. application Ser. No. 12/347,870, filed Dec. 31, 2008, which claims the benefit of U.S. Provisional Patent Application No. 61/018, 168, filed on Dec. 31, 2007, which are each incorporated by reference herein.

FIELD OF THE INVENTION

The present invention is related to nanomaterials having adjustable properties and methods of making such materials. Accordingly, the present invention involves the fields of nanotechnology, chemical engineering, materials science, and physics.

SUMMARY OF THE INVENTION

A solid layered composite nanoparticle can have properties with reduced temperature dependency. The nanoparticle can include a core and an outer shell. The outer shell can include multiple layers. The core and the shell can have compositions that are different and can be chosen such that the composite nanoparticle exhibits a buffered temperature dependency with respect to at least one physical property. Non-limiting examples of physical properties include refractive index, magnetism, electrical conductivity, and combinations thereof.

Likewise, a nanoparticle film or coating can include a plurality of nanoparticles crosslinked to a gel. The gel can include a mixture of inorganic and organic polymers of varying flexibility. The nanoparticles can include a core and an outer shell. The core and outer shell can have compositions which are different and chosen so that the composite nanoparticle exhibits a buffered temperature dependency with respect to at least one physical property.

Also taught herein is a method of making a nanocomposite film coating. The coating can be made by forming a plurality of solid layered composite nanoparticles having properties with reduced temperature dependency. The formation of nanoparticles can include providing a core material, and forming an outer shell having one or more layers. The core and outer shell can have compositions that are different and chosen so that the composite nanoparticle exhibits a buffered temperature dependency with respect to at least one physical property. The method of forming the film coating can further include forming a gel including a mixture of inorganic and organic polymers of varying mechanical flexibility, and crosslinking the nanoparticles with the gel to form a nanoparticle gel. The nanoparticle gel can then be formed into a thin film and can coat an object.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Figure 1A:
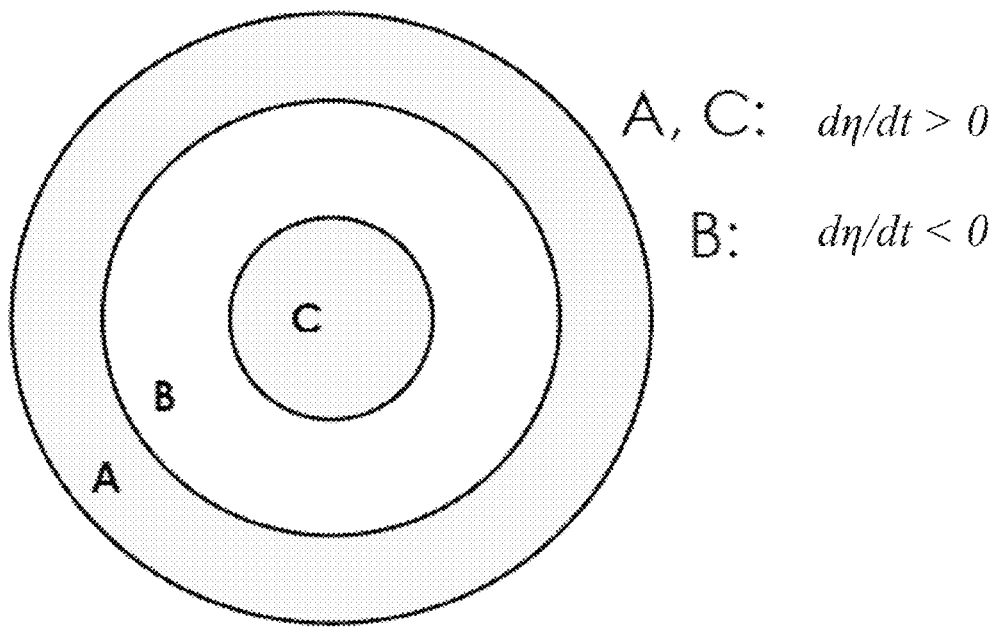
FIG. 1a is a diagram of a composite nanoparticle having three layers, A, B, and C, in accordance with one embodiment of the present invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a particle" includes one or more of such particles, reference to "layers" includes reference to one or more of such layers, and reference to "coating" includes one or more of such steps.

Definitions

In describing and claiming the present invention, the following terminology will be used in accordance with the definitions set forth below.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.6 mm to about 0.3 mm" should be interpreted to include not only the explicitly recited values of about 0.6 mm and about 0.3 mm, but also include individual values and sub-ranges within the indicated range. Thus, included in this numerical range are individual values such as 0.4 mm and 0.5, and sub-ranges such as from 0.5-0.4 mm, from 0.4-0.35, etc. This same principle applies to ranges reciting only one numerical value. Furthermore, such an interpretation should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. Further, unless otherwise stated, the term "about" shall expressly include "exactly," consistent with the discussion above regarding ranges and numerical data.

Embodiments of the Invention

A composite nanoparticle material that exhibits a dynamic refractive index control across a wide temperature and specified refractive index range is disclosed and described. For example, these nanoparticles can be crosslinked at high density within a silicon-based matrix of suitable consistency for spreading between 2 glass plates. Several optional features of the present invention can include, dynamic refractive index correction as a function of temperature, uniform refractive index values throughout the material at nanoscale spatial resolution, uniform and tailorable heat transfer throughout the material, tunable for any refractive index range, and tailorable for dispersal in a variety of gel matrices and films. One alternative objective is to provide a material with gel-like behavior and a temperature-independent optical refractive index in the range of 1.44-1.50.

In one aspect of the invention is a core-shell nanoparticle made from two or more materials whose $$\frac{d\eta}{dT}$$

compensate one another so as to dynamically maintain a targeted physical property over a specific temperature range and at specified optical transmission wavelengths. Such temperature ranges can include full or sub-ranges of about 3 K to about 400 K. Mixtures of composite nanoparticles with complementary temperature dependent refractive index behavior can be used to widen the temperature range further. The terminal layer can also provide a chemical platform for crosslinking nanoparticles to matrix oligomers which can be induced to gel to a desired consistency with standard gelation initiation methods. This layer (A), shown in FIG. 1a, can be further modified to compensate for changes in refractive index of the oligomeric matrix.

Figure 1B:
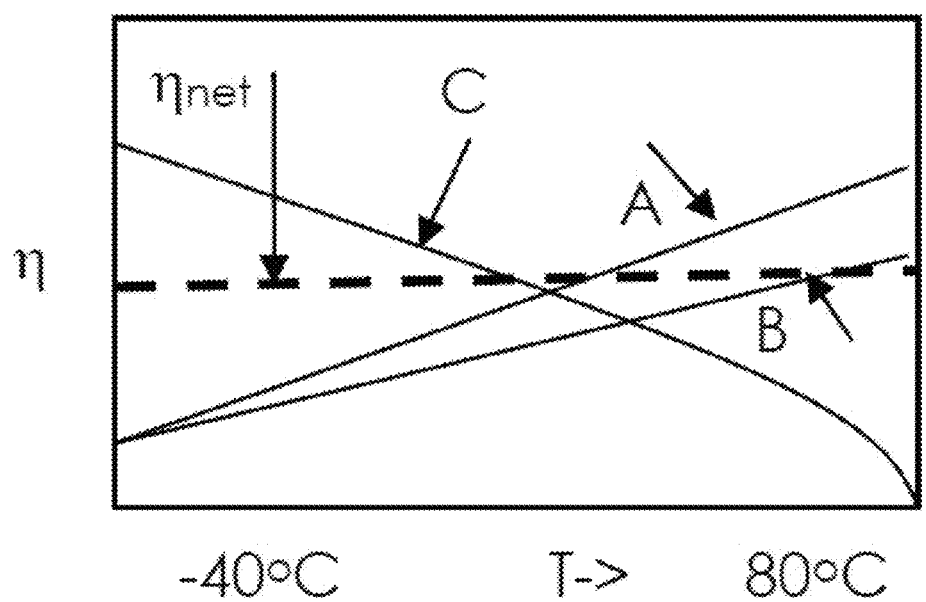
FIG. 1b is a graph illustrating the net effects of combining three materials A, B, and C, as illustrated in FIG. 1a, over a temperature range, in accordance with one embodiment of the present invention.

Composite nanoparticles can be constructed by layer-by-layer overcoating of silicate based nanoparticles with one or more inorganic materials with distinctively different temperature-dependent refractive indices, magnetism, electrical conductivity or other physical properties. For example, the absolute refractive index of synthetic fused silicate for visible wavelengths ranges between 1.47 and 1.45 over the temperature range of interest, and its thermoptic coefficient exhibits significant decrease of about 25%. As illustrated in FIG. 1a, to compensate for this temperature dependent change, nanoparticles (C) can be overcoated with a 10-100's of nanometers thick material (B or A/B) whose refractive index as a function of temperature increases over the same range. Such layers can be constructed from a range of inorganic and organic polymers and can optionally be further doped with polarizable impurities. Light passing through films and coatings constructed from such a particle can emerge without any apparent refraction, or optionally a predesigned refraction profile. The conceptual schematic of an ideal nanoparticle where the A/B layer adequately compensates for that of the core, C, and its expected performance is shown in FIG. 1b.

As a simplified view, the volume fraction of the each material will affect the overall nanoparticle property. Roughly, a 50% volume fraction $ZrO_2$ with 50% volume $SiO_2$ even without the layering should give a refractive index between 2 ($ZrO_2$) and 1.5 (silica). Layering as in the present invention can result in deviation from a simple summation of refractive indices as above. The magnitude of such a difference will depend on the materials chosen, their respective expansion coefficients, a, and water hydration in the oxide lattices. One reason is that refractive index and other physical properties (e.g., magnetism, electrical conductivity) are a function of the density of material which is dependent on the temperature dependent expansion coefficient, a. For a pure $ZrO_2$ nanoparticle it will have an a that is different from $ZrO_2$ crystal (larger) since it will be a hydrated irregular lattice structure, and as temperature changes the water content changes, etc. If the $ZrO_2$ is coated with a layer of hydrated silicate which has its own a going in the opposite direction, if the silicate layer is very thick it will act as a kind of girdle or reinforcement preventing the $ZrO_2$ from expanding or shrinking as it may normally. Thus as a function of $SiO_2$ thickness the effective α of $ZrO_2$ will decrease slightly. Thus, an excessively thick layer of $SiO_2$ may overcompensate the temperature dependent refractive index change by eliminating some of the $ZrO_2$ core's refractive index change mechanically or physically. Therefore, an optimum is where the $SiO_2$ increasing refractive index (expansion) is quenched by the decreasing refractive index of $ZrO_2$ (shrinking) which pulls the $SiO_2$ in, since it is covalently linked. The amount of silicate that is needed, therefore, can be quite small.

The above example discussion creates a material that has a refractive index less that $ZrO_2$ but not quite $SiO_2$. To create a particle that is closer to $SiO_2$, a thin layer of $ZrO_2$ can be coated on a silicate nanoparticle. This means the expanding $SiO_2$, with decreasing refractive index will be boxed in by a thin layer of $ZrO_2$, thus quenching the temperature dependent refractive index change. Although the discussion is directed at refractive index, other physical properties can be likewise adjusted or altered by forming multi-layered nanoparticles. Thus, although the discussion may specify refractive index, it should be recognized that likewise principles equally apply for other physical properties, such as, e.g., magnetism and electrical conductivity.

Optionally, a porous silicate nanoparticle core can be created by mixing a surfactant with silicate, then calcining the surfactant at 500° C. or extracting it away using hot ethanol or chloroform to clear the pores, and then infusing the pores with $ZrO_2$, and allowing it to solidify. This can provide more intimate contact, and less likelihood of spalling than a non-porous core with layers coated thereon. Good impregnation of the $ZrO_2$ into the silicate particles pores can affect performance. $ZrO_2$ is soluble in very acidic conditions, whereas silicate is not dissolved in acid. Silicates typically dissolve in basic conditions.

If layer B or A/B's of FIG. 1a, or likewise a shell including three or more layers, temperature dependent refractive index does not sufficiently compensate for that of A's over the entire temperature range and at a transmission wavelength of interest, a mixture of several types of C@B and C@A/B composite nanoparticles with different compositions can be dispersed throughout the gel. In this manner, the gel can be used to form thin films.

The outermost or terminal layer (A) can optionally have a dual function of additional compensation and a chemical platform for crosslinking these nanoparticles to short oligomers which can be further condensed to form a gel. Cross linking of the active nanoparticle elements to the gelled oligomers can significantly reduce nanoparticle leaching and eliminate unwanted phase separation of the nanoparticles from the matrix at the glass/gel interface in the melt or film formation stage. These events can change the gel's optical properties and cause its delamination from the objects onto which it is coated or the film is placed, such as supporting glass interfaces. One significant advantage of the proposed approach is that it can be used for very thin films, even nanometers thick, since the oligomer backbone that carries the nanoparticles can easily be crosslinked directly to the glass or other supporting substrate or object. When used in a thin film coating, thicknesses from about 30 nm to about 30 µm are broadly typical, with about 250 nm to about 600 nm being particularly suitable for optical coatings.

The nanoparticles of the present invention can be embedded in a suitable matrix which can depend on the particular application. Non-limiting examples of matrix materials can include gels, ceramics, semiconductors, plastics, reinforced plastics, and the like. Ceramics mixed with essentially glass nanoparticle reinforcements can achieve the hardness of ceramics with the optical clarity of glass. Similarly, suspensions can be formed with the nanoparticles dispersed in a dispersant, e.g., silicone oil, mineral oil, other organic or inorganic solvents. Electro- or solution-deposited semiconductor and/or ceramic materials can also be suitable. Semiconductor matrices can be useful in photonic circuitry. Synthetic opals can be metal nanoparticles surrounded by silicate or silicate nanoparticle with some dopant arranged in an ordered array. The nanoparticles can be embedded in a suitable matrix to form a thin film coating, optical fiber, or other suitable material as described in more detail herein.

A high nanoparticle concentration in the gel, can affect the oligomeric gel's elastic modulus significantly, so an optimal matrix composition can be designed in light of this knowledge. Depending on the processing requirements for film formation, an optimized mixture of oligomers of various lengths and branching can be recommended to achieve the desired setting time, and final consistency. If desired, a low vapor pressure alcoholic additive can be mixed in the matrix to match the refractive index of layer (A).

FIG. 1b shows the temperature independent refractive index of the nanocomposite of FIG. 1a occurring over the range of −40 to 80° C. Spatial uniformity of the material's refractive index at selected temperatures can be obtained using confocal microscopy and polarized excitation light to look for regions enriched in nanoparticulates. Data describing the effect of thermal cycling on the optical and physical integrity of the nanocomposite gel melt, as well as that of the cured gel film can provide an indication of the resiliency and phase stability of this novel material during the mixing and film casting stages, and a study of the effect of thermal cycling on an already set gel gives an idea of the potential damaging effects of dissipated heat on the optical properties and distribution of nanoparticle's integrity in a set gel film which can arise during high light flux transmissions.

The acceptable variation in properties over a given temperature range can depend on the application. Such studies can be utilized for improvement and optimization of nanoparticle and nanoparticle films. For some applications, a percentage change of less than +/−0.0001 refractive index units can be required. Pure fused silica quartz goes up only slightly over −40 to 80° C., e.g 1.456-1.458. The precise refractive index and the precise temperature fluctuation can also depend on the amount of water in the structure, e.g. in a gel embodiment. Calcining the water away from a nanoparticulate silicate changes the refractive index, and returning the water restores the refractive index. In the case of nanoparticulate silicate, the lattice structure of the silicate is not crystalline (i.e. closest packed) but is an amorphous water packed mass. If the particles are a different kind, for instance temperature independent magnetic susceptibility or conductivity, then the allowed temperature variation may be greater. Thus, in accordance with the present invention, the temperature independence over a given range for a target property can be tuned to the application requirements.

As noted, FIG. 1a and FIG. 1b illustrate a nanoparticle and related refractive index over a temperature range. The same general configuration can be employed to design nanoparticles with tailored magnetic susceptibility and/or conductivity properties over a range of temperatures, magnetic, and electric fields.

A concept and synthesis technology for a composite nanoparticle material which can be used to develop nanocomposite films and suspension with 1) dynamic refractive index control across a wide temperature and wavelength of light, and specified refractive index range, or 2) magnetic susceptibility or electronic conductivity over a wide temperature, magnetic field and electric field range. The terminal layer can also provide a chemical platform for crosslinking nanoparticles to matrix oligomers which can be induced to gel to a desired consistency with standard gelation initiation methods.

The described nanoparticles can be tailored for optimal dispersal in a variety of inorganic or organic elastomer or viscoelastic matrices of suitable consistency for spreading using spin coating combined with temperature, magnetic or electrical field gradients to control the placement of the nanoparticles. The nanocomposite material can be further post processed to crosslink the material at adequate density within the inorganic or organic-based matrix to form coatings and thin films with specified mechanical and hardness properties. Anticipated corollary properties resulting in such nanocomposites include a material with selected properties spread uniformly throughout the material at nanoscale spatial resolution, and uniform and tailorable heat transfer throughout the material.

Core-shell nanoparticles can be made from two or more materials whose temperature dependent, electric field dependent or magnetic field dependent properties compensate one another will dynamically maintain a targeted refractive index, electronic conductivity or magnetic susceptibility over a specified temperature, electric and/or magnetic field range. Mixtures of composite nanoparticles with complementary behavior can be used to widen the operational range of the nanocomposite material further.

The ability to make multilayered nanoparticles (two or more layers) with metals and metal oxides is well documented in the literature. Presented herein is that selection of the materials in each nanoparticles layer can be used to develop layered nanoparticles with temperature independent refractive index, magnetic or electronic properties. Further, such nanoparticles and their mixtures in a base viscoelastic, elastomeric or glass matrix can be used to make tailored films and coatings for a variety of applications. The approach is expected to improve the uniformity of the resulting optical and other properties in the material since compensating regions will be spatially fixed at nanoscale density. Non-uniform aggregation of nanoparticles, (a common problem in nanocomposite blends using multiple types of nanoparticles) is therefore less of a property degrading factor. Commonly available nanoparticle dispersion methods (e.g. surface functionalization) can be utilized to reduce aggregation problems for the described composite nanoparticles, and therefore this material has a good potential to develop extremely high quality (high resolution) optical, magnetic or electronic nanocomposite materials over that of current state of the art.

The multilayer composite nanoparticles concept is extended further to include materials with tunable magnetic or electronic properties normally temperature, electric field or magnetic field dependent. Core-shell nanoparticles (core and single coating layer) of metals such as Ag@Au or metal/metal oxides such as Au@$SiO_2$, Au@$TiO_2$, and Au@$Fe_2O_3$ have of course been reported. In the case of metal-metal core shell nanoparticles, the composite electronic properties of the material are different from the sum of the two materials in part due to the high electrical conductivity and lattice mismatch between the two layers. Similarly, it is noted that the optical properties of noble metal nanoparticles coated with an oxide layer are also changed since many of the optical properties of nanoparticles are dominated by surface states (dangling bonds and oxidation centers) that are eliminated once the oxide coating has covalently bonded. The composite nanoparticles described herein can include separating the adjacent layers with an appropriate intervening insulating layer, or selecting the ordering of layers in such a manner so that each active layer operates in a predictable if not independent manner from other layers nearby. In this way, tailorable temperature dependent magnetic susceptibility or electronic properties of the particles is achieved. Such a more complex embodiment may be a nanoparticle containing multiple metal, metal oxide and organic layers arranged in an optimal order.

The nanoparticles, gels, films, and fibers of the present invention can be used in a wide variety of applications including, but not limited to, temperature independent refractive index films for CRT screens, precision optical components; coatings for automotive windshields; coatings for windows used in thermoelectrically cooled photodetectors; coatings for optical elements used in finer optics communication relay stations at high altitudes and extremely cold environments (e.g. Antarctic, North Pole); nanosized optical lenses for lithography, near field scanning probe microscopy, and microchip identification; magnetic disk storage devices; chemical and biological sensor magnetic arrays; nanoscale magnetic field generators in microfluidic devices; high resolution electrically conductive touch pads; gradient field electronic field generators for microfluidic devices; coatings for electronic devices with tunable dielectric breakdown; conductive nanocomposite components for electronic devices; coatings for microresonators, laser cavities; and the like.

Films and coatings according to the present disclosure are particularly fitting for use with optical displays, such as those used in video screens, and in harsh environments. The films described herein may also be utilized with flexible or other solar panels screens to get maximum light input regardless of the temperature. Additionally, it should be noted that films and coatings according to the present disclosure can be formed to include a degree of flexibility, which greatly increases the potential applications of such a coating. Flexibility can be imparted by the molecular weight and structure of polymers included in the film. The polymers can also have some unique $d\eta/dT$ that can be modified by changing the structure of the polymer and the way the polymer interacts with the nanoparticle. The $d\eta/dT$ increases with an increase in the degree of organic polymerization, which increases $M_W$ and branching. One way to view this is that refractive index depends on the coefficient of thermal expansion, and this coefficient depends on how the molecules in the material give as temperature is increased, or pack when it is decreased Thinking of increasing temperatures first the higher the $M_W$ or branching number the more entanglements and number of physical interactions (van der Walls, ionic etc.) exist. So they tend to reduce the amount of expansion possible as temperature increases. Therefore there is less refractive index change. Considering decreasing temperatures, there will be more shrinkage as the temperature is decreased as the $M_W$ goes up. However there is a range where this will be true, if the $M_W$ is very high, and the temperature change is fast, there is not enough time for the molecule to rearrange, relax, and so they may quench the shrinking altogether. In this case, the rate of temperature change becomes important. Exactly how severe these effects are on the nanoscale depends on how the polymer is connected to and interacting with the nanoparticle (a brush versus a flat layer). The overall effect on net refractive index will then depend on volume fraction of polymer versus nanoparticles. As a general guideline, a nanoparticle having a smaller $d\eta/dT$ can be achieved with higher proportions of silicate within the nanoparticles. Further, generally an increase in nanoparticle volume fraction in a matrix can result in a decrease in apparent refractive index of the nanoparticles. If the density of nanoparticles within the cone varies as you approach the apex of a fiber probe tip then this could be important.

The nanoparticles of the present invention can also be used to create temperature independent light conduits consistent with the principle already discussed. One specific embodiment is to make an improved near-field scanning optical microscopy (NSOM) fiber optic. Current fibers are drawn from silicate to a 50 nm point and light is trapped in them. Thus, the tip gets hot, and the refractive index changes accordingly. A fiber made from nanoparticles of the present invention embedded in glass can get hot but would have less refractive index change meaning the transmission of energy into the specimen through the fiber would be substantially the same regardless of temperature. Thus, this would reduce or avoid concerns about temperature calibration of measurements. An NSOM fiber can either be straight or cantilevered near the end, but must be tapered severely to a point, i.e. tip of a cone, that is essentially the size of a single nanoparticle described here. The tip of the cone can only fit one nanoparticle, and so the tip radius is defined by the geometry of the one nanoparticle. For light to propagate through all the nanoparticles in the cone, they have to be cemented together with a material that does not cause light substantial loss (i.e. be refractive index-matched). Since the temperature gradient moving to the tip of the cone is quite steep during use, the temperature compensating ability of the nanoparticles can change smoothly approaching the cone tip. Usually the hotter it is the more the refractive index will change, so more highly $d\eta/dT$ compensating particles can be embedded in the hot regions (e.g. nearer the tip), and lower $d\eta/dT$ compensating nanoparticles in the cooler regions (e.g. remote from the tip) to have a net high light throughput.

In one aspect of the present invention, outer shell layers, e.g. the $3^{rd}$ or $4^{th}$ layers, can also function as a mechanical element, to allow or prevent the nanoparticles from forming large gaps between them. If the particles expand too much stress cracks can form. These outer layers can typically follow the general temperature dependence of the nanoparticles, have minimal effect on refractive index (e.g. if their volume fraction is small), and be elastic to accommodate the maximum dimension swings that could happen.

Thus, one embodiment of the present invention can include a gradient nanocomposite fiber, where a set of nanoparticles is arranged non-randomly to compensate for optical changes caused by temperature/heat transfer gradients. In particular, the type and concentration of nanoparticles can be adjusted as described herein, to buffer or otherwise control the $d\eta/dT$ of the fiber. One specific example application of such fibers is in lithography where the NSOM tip can be used as a kind of pencil or marking instrument. In another aspect of the gradient fiber is that the toughness of the tip can be increased despite the fact it is getting thinner, by changing the nature of the outer shell layers, e.g. $3^{rd}$ and $4^{th}$ layers, so that the particles are cemented together more tightly at the tip where there are fewer particles and less tightly where the fiber is thicker. Such toughness can determine the overall flexibility of the probe and whether the probe can be pressed hard or not. This is an important part of getting high resolution images, and affects whether you damage the specimen by scraping the cantilever over it. The principles of the present invention also allow formation of combination scanning tunneling microscopy (STM) and NSOM tips (which do not currently exist to the knowledge of the inventors). With nanoparticles that are conductive, but also transparent to the particular light frequency, and also temperature compensating, the electrical conductivity can be maintained, and at the same time achieve an optical throughput. In such a case, how these parameters change with temperature can be controlled along the fiber length and especially toward the cone tip. Cantilevered NSOM probes are commercially provided to have a certain resonant frequency. This is a factor of the thickness of the fiber, the angle of the bend, and the taper angle as the tip of the cone is approached. The above concept of a nanoparticle gradient can be applied to thin films as well to reduce loss of light at interfaces, which can have temperature gradients.

Figure 1C:
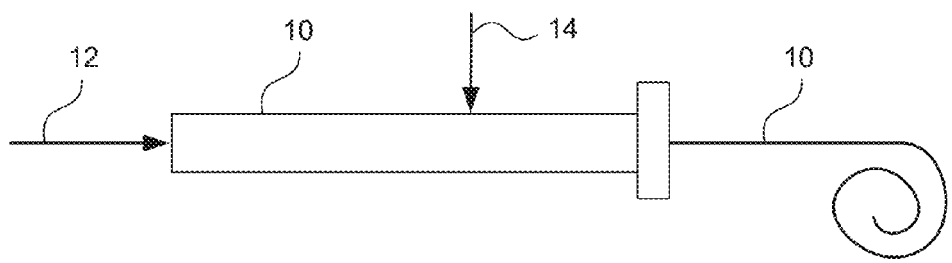
FIG. 1c is a schematic of an extruder system used to form optical fibers in accordance with one embodiment of the present invention.

Suitable tapered nanocomposite fibers can be formed using any number of approaches. Two exemplary approaches include extrusion followed by localized laser heating to form a tip end and molding/etching processes. FIG. 1c illustrates an extrusion process which can optionally be used to obtain a controlled nanoparticle distribution in the final fiber. An extruder 10 can include a feed of molten matrix material 12. The feed can optionally include a first type of nanoparticle. An optional second type of nanoparticle can be introduced into the molten fiber by a computer controlled mixing port 14. This mixing port can be used to adjust the proportion of each type of nanoparticle along the length of the fiber. For example, the graded fiber can be formed by periodic changes to form enriched regions having the desired nanoparticles for tapered tips. An extruded product 16 is then pulled from the extruder which product can then be cooled. The tapered tips can then be formed by heating the enriched regions of the fiber (e.g. having the desired tip nanoparticle content) using electrical heating or laser, for example. As the enriched region is heated, the fiber softens and can be pulled. As the diameter reduces, a neck area forms which eventually breaks to form two tips. This approach works well for silicate glass and polymers having suitable viscosity and sufficient non-elasticity to prevent deformation of the tip upon breaking at the neck region.

Figure 1D:
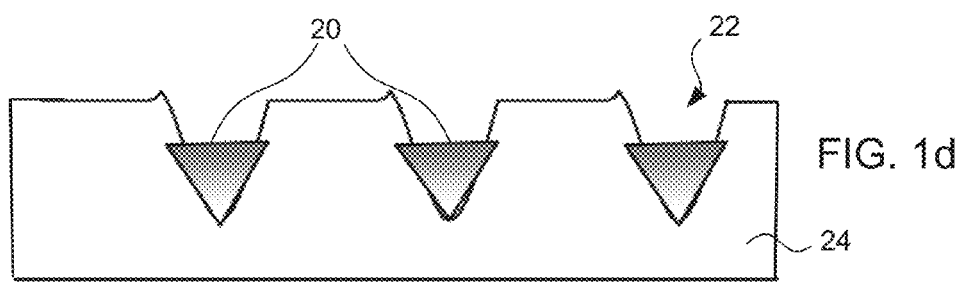
FIG. 1d is a side cut-away view of filling a mold with nanoparticles accordance with another embodiment of the present invention.
Figure 1E:
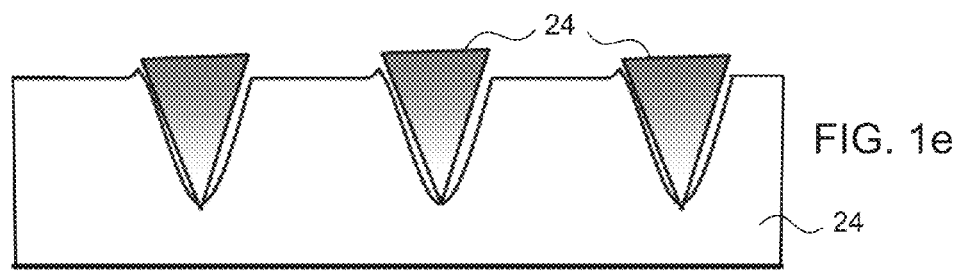
FIG. 1e is a side cut-away view of annealing the filled mold of FIG. 1d.
Figure 1F:
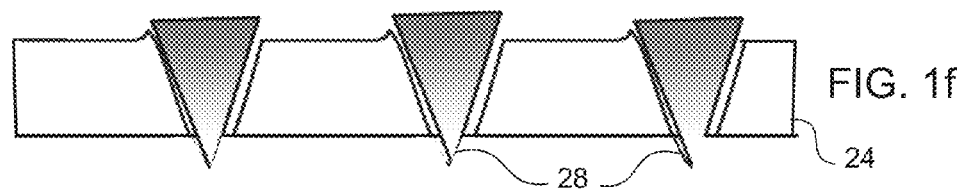
FIG. 1f is a side cut-away view of etching to expose tips of the annealed composite of FIG. 1e.
Figure 1G:
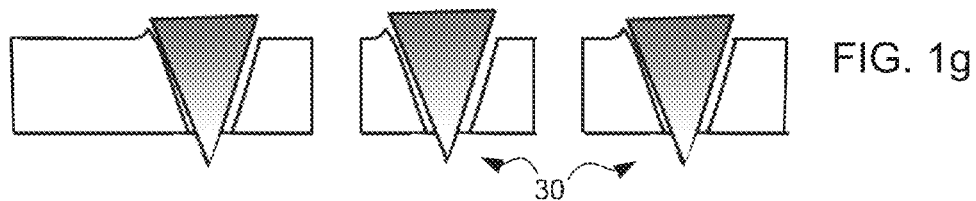
FIG. 1g is a side cut-away view of individually separated probe tips formed in accordance with the process of FIGS. 1d-1f.

FIGS. 1d-1g illustrate a second alternative approach to forming tips for NSOM probes. FIG. 1d shows depositing nanoparticles 20 into layers within recesses 22 formed in a mold material 24. The mold material can be any suitable material such as a plastic, ceramic, glass, or other material which is non-adherent to the nanoparticles. The particles can be deposited, for example, by vapor or aerosol processes. As shown in FIG. 1e, the deposited nanoparticles can then be annealed at a temperature sufficient to allow the particles to blend with a matrix material which was also deposited, e.g. as a distinct layer or simultaneously with the nanoparticles, to form annealed cones 26. Silicone polymer is one particular example of a matrix material for such embodiments, although others can be used as described previously. At higher temperatures the layers of adjacent nanoparticles can blend to make the entire cone shaped volume solid. The mold material 24 can be left in place as part of the probe which is at least partially etched to exposed the tips 28 as shown in FIG. 1f. The individual probes 30 can be cut apart by a suitable method, e.g. laser, dicing, etc., as shown in FIG. 1g, for integration into a suitable device.

As noted, the nanoparticles discussed herein can be used to develop nanocomposite suspensions, films, and fibers with 1) dynamic refractive index control across a wide temperature and wavelength of light, specified refractive index range, and over a specified dimension or 2) magnetic susceptibility or electronic conductivity over a wide temperature, magnetic field, electric field range, and specified dimension. Core-shell nanoparticles can be made from two or more materials whose temperature dependent, electric field dependent or magnetic field dependent properties compensate one another will dynamically maintain a targeted refractive index, electronic conductivity or magnetic susceptibility over a specified temperature, electric and/or magnetic field range. Mixtures of composite nanoparticles with complementary behavior can be used to widen the operational range of the nanocomposite material further.

In one aspect, the core and outer shell (single or multi-layered) can be composed of materials independently selected from a solid metal oxide, metal, or polymer. In one embodiment, the core can comprise or consist of a pure metal or an oxide from the group IIA, IIB, IVB, VB, VIB, VIIB, VIIIB, IB, IIB, IIIA, IVA and VA metals or combinations thereof. In one embodiment, the outer shell can include at least one layer that comprises or consists of a pure metal or an oxide from the group IIA, IIB, IVB, VB, VIB, VIIB, VIIIB, IB, IIB, IIIA, IVA and VA metals different from that of the core.

Although not intended to be limiting, in one aspect, the nanoparticle has a diameter of about 1 nm to about 300 nm. In a further aspect, the nanoparticle has a diameter of about 20 nm to about 50 nm. The outer shell can optionally include one or more layers which are each up to 100 nm thick.

Optionally, the core and outer shell, including any layers within the outer shell, can be covalently bonded to adjacent layers. In one aspect, the covalent bonding between layers is of the form selected from the group consisting of direct, via homofunctional linker, via heterofunctional linker, and combinations thereof, wherein the homo and the hetero independently include bi and trifunctional crosslinkers. In one aspect, the bi and trifunctional crosslinkers can include functional groups $NH_2$, $SH_2$, SCN, OH, COOH, $TiO_3$, $SiO_3$ and $PO_4$, and combinations thereof. Further, at least some of the multiple layers of the outer shell, in one aspect, consist of an organic polymer covalently bonded to adjacent underlying and overlying oxide or metal layers. In such a case, the organic polymer layer can be optionally selected from the group consisting of optically active polymers, conductive polymers, viscoelastic polymers, elastomers, and combinations thereof. In one aspect, the organic polymer layer can be a viscoelastic polymer. In another embodiment, the organic polymer layer can be an optically active polymer. In another embodiment, the organic polymer layer can be a conductive polymer. In still another embodiment, the organic polymer layer can be an elastomer. In one aspect, the terminating layer of the nanoparticle shell can be a polymer. Examples of suitable polymers include, but are not limited to, viscoelastic: poly methymethacrylate, poly phenelene sulfide, poly phenylene oxide, polyvinylidene chloride, polycarbonate; optically active: phenyl substituted poly(p-phenylenevinylene, polyaramids, (pregnenolone methacrylate)-b-poly[(dimethylamino)ethyl methacrylate] and poly (pregnenolone methacrylate-co-methyl methacrylate; electroactive: poly(tetrafluoroethylene), poly 2-acrylamido-2-methylpropane sulfonic acid; elastomers: polysilicones, polyvinyl acetate and block copolymer configurations of these.

Various materials can be included in the nanoparticle. In one aspect, the core or shell or both core and shell can be is doped with an organic dye. Where the shell includes multiple layers, one or more layers can be doped with an organic or inorganic dye. In one aspect, the organic dye can be a ruthenium or lanthanide-based dye. A wide variety of dyes can be suitable. As a general guideline, the choice of dye can be based on the application. For example, if conductivity is desirable a metal based dye can be used, since many of them allow electron transfer before they emit light. If light emission is desired an all organic dye can be suitable though they have a tendency to self quench if the concentration is too high, or if the dye is packed too tight. Hydrazide dyes such as Cascade Blue, Pyrene, Fluorescein, Rhodamine, Luminol and others are several non-limiting examples.

Optionally, the nanoparticle can undergo post-processing. In one aspect, one or more of the multiple layers of the outer shell can be modified by at least one post processing methods selected from the group consisting of heat, gamma irradiation, chemical reaction, and combinations thereof. In another embodiment, some of the multiple layers of the outer shell can include repeating layers. In a further embodiment, some of the repeating layers can be mesoporous, having been synthesized in the presence of a surfactant which self-assembles into nanosized structures (e.g. cylinders, worms, bilayers, micelles, etc.) on the surface of the forming nanoparticle. The mesoporous layers can be configured for deposition of metal oxide or pure metal. Non-limiting examples of surfactants include quarternary ammonium, alkyl silane, alkyl titanate, alkyl phosphate, or alkyl silicate surfactant, and combinations thereof. The molar ratio between the inorganic and the surfactant can be adjusted along with an overall concentration can facilitate successful formation of such mesoporous layers as described in more detail in U.S. Pat. No. 6,913,825, entitled "Process for Making Mesoporous Silicate Nanoparticle Coating and Hollow Mesoporous Silica Nano-shells," which is incorporated here by reference in its entirety.

In one aspect, the composite nanoparticle can be configured so as to exhibit substantially no, or tunable refractive index or reflectivity change as a function of external temperature. In another embodiment, the composite nanoparticle can be configured so as to exhibit buffered refractive index change as a function of wavelength of light in the one or more of the regions of the UV, visible or infrared spectrums, wherein the buffered refractive index change is substantially free or free of change as a function of wavelength, and the buffered temperature independency is optional.

Optionally, the core material and repeating layers are selected from the group consisting of IIA, IIB, IVB, VB, VIB, VIIB, VIIIB, IB, IIB, IIIA, IVA and VA elements, their oxides, and combinations thereof, such that the composite nanoparticles exhibit temperature or electric field independent or tunable diamagnetism or ferromagnetism.

As noted, the nanoparticles discussed herein can be utilized to form a thin film or bulk solid such as within a gel or glass. Optionally, a thin film can be formed including spin coating. In a further embodiment, the spin coating can occur in the presence of a magnetic field gradient. Alternatively, the thin film can be prepared as an indexable thin film by site selective binding of the nanoparticles to a lithographically etched or printed plate and overcoating with inorganic or organic polymer protective coating. Nanoparticles can include a layer of molecules, e.g. a termination layer, which can make chemical interactions with a polymer matrix of a gel which can tighten or loosen interactions via attractive or repulsive van der Waals interactions. Although the concentration of nanoparticles can vary per application, the nanoparticles can generally be present from about 95 vol % to about 20 vol % of the material. Generally, when total nanoparticles are present at less than about 20%, there is insufficient quantity to effectively influence material properties.

Different nanoparticles can be utilized to form a single coating. In one aspect, nanoparticles having two or more different compositions are included in a single coating. The proportion of each nanoparticle can vary considerably depending on the desired final properties of the material.

EXAMPLES

Example 1: Refractive Index

The refractive index of a composite material can be estimated using one of several theoretical models. The simplest approach is to use the relationship: $\eta_{total}=x_A\eta_A+x_B\eta_b$ where $1=x_A+x_B$ to obtain a composite refractive index as a function of volume fraction composition at a given temperature. This approach assumes that the mixture of the two materials does not change the intrinsic refractive index of each. In reality for a nanocomposite particle the layering of materials can affect the refractive of each as a result of lattice mismatch which can change the density of the material from what it might be in its bulk state. For a material consisting of a core of material A and a single layer of B, this can be generally expressed as $\eta=x_A\eta_A+x_B\eta_b+F$ where F is a correction that accounts for the change in density of layer, which varies with the thickness. A possible manifestation of the term F for a single coating layer of component B is for example $$F_B = \sum_d x_B \frac{(\rho_B - \rho_A)}{\rho_A} \eta_B e^{-d/D}$$

where the normal density of material A is increased or decreased by the fractional difference in material densities of the two materials. As the distance away from the interface increases, the correction should decrease exponentially, and the material will eventually possess a normal refractive index. The change in refractive index over the thickness of this layer depends of the nanoparticles size, since for small nanoparticles the high surface curvature adds additional strain to the overlying material lattice. For large particles, the surface is relatively flat, and only the intrinsic density difference plays a dominant role. The average refractive index of this layer may thus be slightly larger or smaller than the bulk refractive index of the material. Each successive layer will have its own average refractive index that depends on the layer composition, thickness, density and refractive index change, and so the average particle refractive index is the average of refractive indices of each layer appropriately accounting for their ordering (e.g. which material is the substrate for the other), their thickness, and the number of each layer.

To obtain a similar material with unchanging refractive index as a function of temperature, a similar set of equations involving $$\frac{d\eta}{dT}$$

is needed. In this case the temperature dependent correction for the material B layer must include an expression for the temperature dependent density change of each material via the temperature dependent compressibility, a.

Using these equations, it is possible to predict the temperature dependent refractive index change of each material and how it is affected by temperature, the size of the nanoparticles, the thickness of each repeating layer, and its composition. It is also possible to combine this information and predict the temperature dependent refractive index properties of a composite nanoparticle with more than two repeating layers by summing over, and averaging the refractive index of each layer as described. To generate a nanoparticle with unchanging refractive index as a function of temperature each layer may be selected such that some of the layers possess a positive change in refractive index with temperature (including corrections for particle size and layer thickness), and others a negative change in refractive index with temperature (including corrections for particle size and layer thickness). The average value of all layers should result in an unchanged value of refractive index over a finite temperature range.

Figure 2:
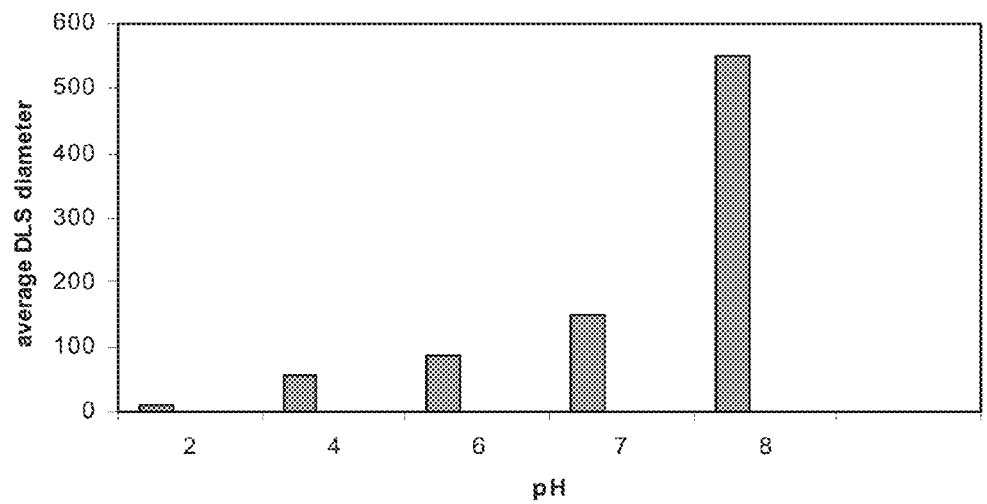
FIG. 2 is a bar graph illustrating the average diameter of a $ZrO_2$ nanoparticle as a function of titration pH obtained using ammonium hydroxide in accordance with one embodiment of the present invention.

Example 2: Synthesis of Multilayered $ZrO_2/SiO_2$ Nanoparticles for Temperature Dependent Refractive Index Property $ZrO_2$ powder obtained from Sigma Aldrich was dissolved in aqua regia (40% $HNO_3$/40% $H_2SO_4$, 20% water overnite (~0.5 mg/L). The resulting solution was opaque at a pH below 1. Nanoparticles of $ZrO_2$ were obtained by titrating the solution with microliter quantities of 5M NaOH or 5M $NH_3OH$ solution prepared in water. Nanoparticles size was controlled by the concentration of $ZrO_2$ and the pH of the titrated solution. In general higher concentrations of $ZrO_2$ lead to uncontrolled aggregation of nanoparticles at pH values near neutral, which concentration less than 1 mM produced nanoparticle suspensions. For a given concentration of $ZrO_2$ the extent of reaction (growth of nanoparticles could be manipulated by stopping the titration at various pH values between pH 5 and 8 as shown in FIG. 2. However much improved size control should be obtained by also manipulating the total amount of $ZrO_2$ so that the reaction goes to completion at whatever is the terminating pH. This approach has the benefit of reducing the amount of unreacted material left over, avoiding the need to remove it by dialysis and reducing the danger of slow coalescence of the nanoparticles.

Figure 3:
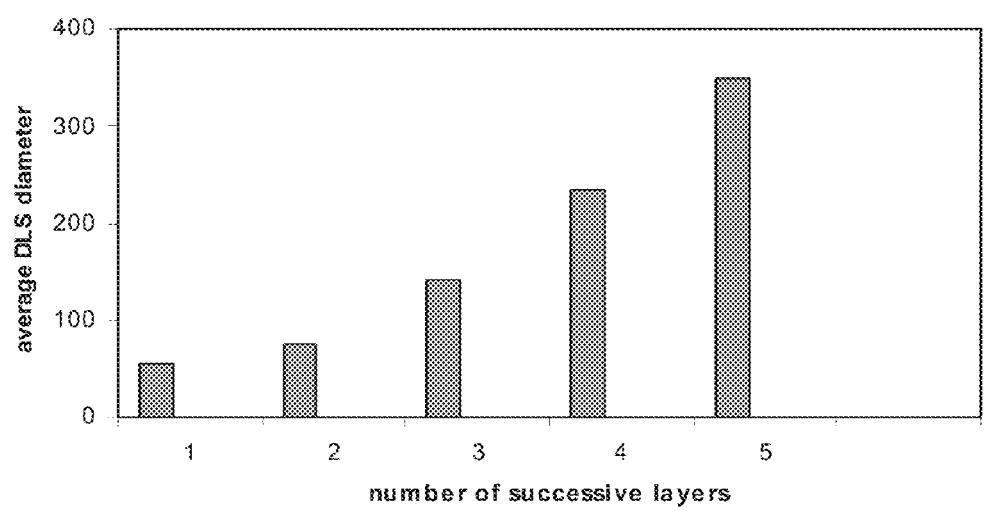
FIG. 3 is a bar graph illustrating the average diameter of a $ZrO_2/SiO_2$ nanoparticle as a function of number of repeated $ZrO_2$ and $SiO_2$ coatings at pH 6 in accordance with an embodiment of the present invention.

$ZrO_2$ nanoparticles were coated with silicate, by adding tetramethoxy silane to a rapidly magnetically stirred $ZrO_2$ suspension at room temperature. The amount of tetramethoxy silane used was calculated from the estimated surface area of the $ZrO_2$ nanoparticles in the suspension (calculated from light scattering average diameter estimate). The tetramethoxysilane was added in portions corresponding to 1 nm layer silicate coverage to avoid excessive concentration of unreacted silicate which could lead to aggregation of particles. While it is impossible to avoid the nucleation of solid silicate particles altogether particularly at acidic pH, restriction of the average concentration of these ions at all times biases toward their precipitation onto existing seeds of $ZrO_2$ nanoparticles. After sufficient silicate was added to form a 20 nm thick layer, additional $ZrO_2$ solution was added to the stirring suspension. The sudden drop in suspension pH has the benefit of sweeping away any unreacted silicate monomers by precipating them onto nearby seed particles. The pH was readjusted to compensate for the additional aqua regia solvent and to begin the process of $ZrO_2$ precipitation onto the seed particles. FIG. 3 shows nanoparticle diameter as a function of layers at pH of 6.

Figure 4:
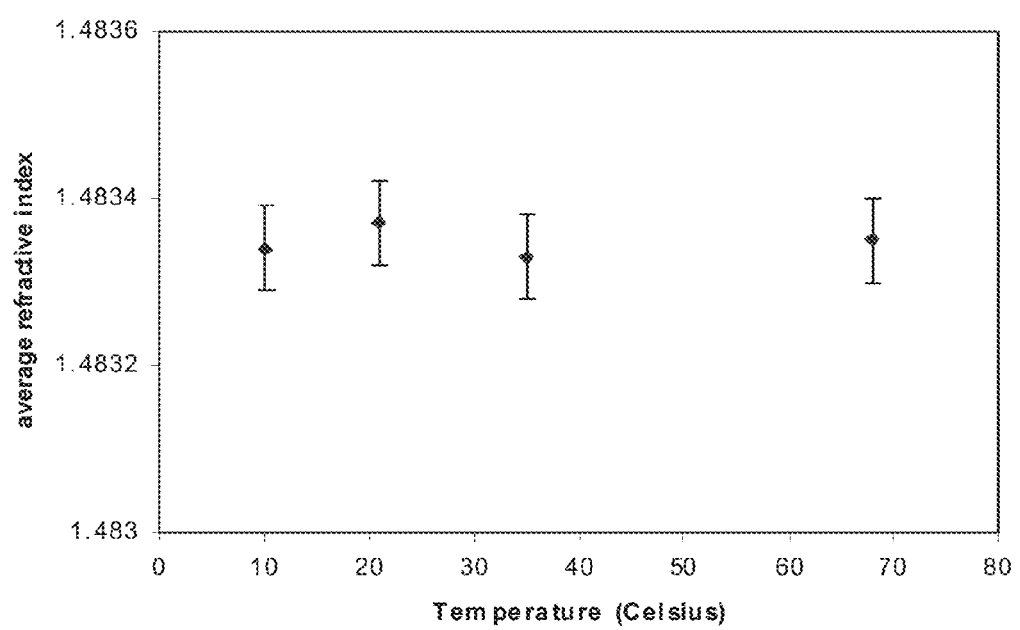
FIG. 4 is a graph of refractive index of a glass mounted silicate gel Langmuir-Blodget thin film containing a high concentration of $ZrO_2/SiO_2$ nanoparticles (~50% w/v) as a function of temperature in accordance with an embodiment of the present invention. Error bars represents the uncertainty of the measurement based on the average of 5 repeated measurement values at a given temperatures and is limited by the instrument resolution, the thickness distribution of each successive layer, and the temperature stability of the thermoregulation system.

The refractive index of a $ZrO_2/SiO_2$ nanoparticle made from 10 repeating $ZrO_2$ and $SiO_2$ layers was measured using a Bausch & Lomb refractometer with temperature controlled sample stage capable of measurement from 10 to 60° C. The results are shown in FIG. 4. Samples of nanoparticles were prepared by vacuum drying 20 ml nanoparticles suspension to concentrate the nanoparticles and then resuspending them by mild sonication for 10 minutes in a small volume (200 microliters) of viscous silicone oil. The sample was spread on the refractometer imaging glass and allowed to equilibrate to the sample holder temperature for about 10 minutes before measurement.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiment(s) of the invention. It will be apparent to those of ordinary skill in the art that numerous modifications can be made without departing from the principles and concepts of the invention as set forth in the claims.

What is claimed is:

1. A nanocomposite material comprising a plurality of nanoparticles in a matrix, said nanoparticles comprising a core and an outer shell, wherein said core and said outer shell have compositions which are different and have opposite temperature dependent gradients with respect to refractive index, said matrix, core and outer shell compositions being chosen such that the nanocomposite material exhibits a buffered temperature dependency with respect to refractive index, and wherein the material is a nanocomposite thin film coating wherein the matrix is a gel comprising a mixture of polymers of varying flexibility, and the plurality of nanoparticles are crosslinked to the gel.

2. The material of claim 1, wherein the buffered temperature dependency exhibits substantially no refractive index or reflectivity change as a function of external temperature over the finite temperature range.

3. The material of claim 1, wherein the finite temperature range is from about −40° C. to about 80° C.

4. The material of claim 3, wherein the finite temperature range is from about 10° C. to about 70° C.

5. The material of claim 1, wherein the material is prepared as an indexable thin film by site selective binding of the nanoparticles to a lithographically etched or printed plate and overcoating with a polymer protective coating.

6. The material of claim 1, wherein the gel comprises a mixture of inorganic and organic polymers of varying magnetic dipole strength and conductivity.

7. The material of claim 1, wherein the gel is formed in the presence of a magnetic or electric field gradient such that the buffered temperature dependency includes a gradient.

8. The material of claim 1, wherein the plurality of nanoparticles vary in composition so as to form a gradient in temperature dependency across the thin film.

9. The material of claim 1, wherein the material is a nanoparticle suspension and the matrix comprises at least one of silicone oil, mineral oil, inorganic solvent, and organic solvent.

10. The material of claim 1, wherein the outer shell includes multiple layers.

11. The material of claim 10, wherein at least some of the multiple layers of the outer shell consist of an organic polymer covalently bonded to adjacent underlying and overlying oxide or metal layers.

12. The material of claim 11, wherein the organic polymer layer is selected from the group consisting of optically active polymers, conductive polymers, viscoelastic polymers, elastomers, and combinations thereof.

13. The material of claim 10, wherein some of the multiple layers of the outer shell include repeating layers that are mesoporous, having been synthesized in the presence of a surfactant which self-assembles into nanosized structures on the surface of the core nanoparticle or its succeeding layers and wherein the repeating mesoporous layers are configured for deposition of metal oxide or pure metal.

14. The material of claim 1, wherein each of the core and outer shell, including any layers within the outer shell, are covalently bonded to adjacent layers.

15. The material of claim 14, where the covalent bonding between layers is of a form selected from the group consisting of direct, via homo, via hetero, and combinations thereof, wherein the homo and the hetero independently include bi and trifunctional crosslinkers which include functional groups $NH_2$, $SH_2$, SCN, OH, COOH, $TiO_3$, $SiO_3$, $PO_4$, or combinations thereof.

16. The material of claim 1, wherein at least one of the core and the outer shell is doped with a dye.

17. The material of claim 16, wherein the organic dye is a lanthanide-based dye.

18. The material of claim 1, wherein the outer shell is doped with transition metal ligand complexes made from elements from rows 4 and 5 of the periodic table.

19. The material of claim 1, wherein the outer shell is modified by at least one post processing method selected from the group consisting of heat, gamma irradiation, chemical reaction, and combinations thereof.

20. The material of claim 1, wherein the core comprises a silicate based nanoparticle.

21. The material of claim 1, wherein the core and outer shell are selected from the group consisting of IIA, IIB, IVB, VB, VIB, VIIB, VIIIB, IB, IIB, IIIA, IVA and VA elements, their oxides, and combinations thereof.

22. A nanocomposite material comprising a plurality of nanoparticles in a matrix, said nanoparticles comprising a core and an outer shell, wherein said core and said outer shell have compositions which are different and have opposite temperature dependent gradients with respect to refractive index, said matrix, core and outer shell compositions being chosen such that the nanocomposite material exhibits a buffered temperature dependency with respect to refractive index and wherein said matrix is a glass fiber.

23. The material of claim 22, wherein the material is configured as a nanocomposite optical probe having a tapered tip.

24. The material of claim 22, wherein the optical probe is an optical NSOM fiber.

25. The material of claim 22, wherein the plurality of nanoparticles exhibit a $d\eta/dT$ gradient across the optical probe, sufficient to produce a buffered temperature having a lower $d\eta/dT$ at the tapered tip than remote from the tapered tip.

26. The material of claim 22, wherein the buffered temperature dependency exhibits substantially no refractive index or reflectivity change as a function of external temperature over the finite temperature range.

27. The material of claim 22, wherein the plurality of nanoparticles vary in composition so as to form a gradient in temperature dependency across the thin film.

28. The material of claim 22, wherein the outer shell includes multiple layers.

* * * * *